UNITED STATES PATENT OFFICE.

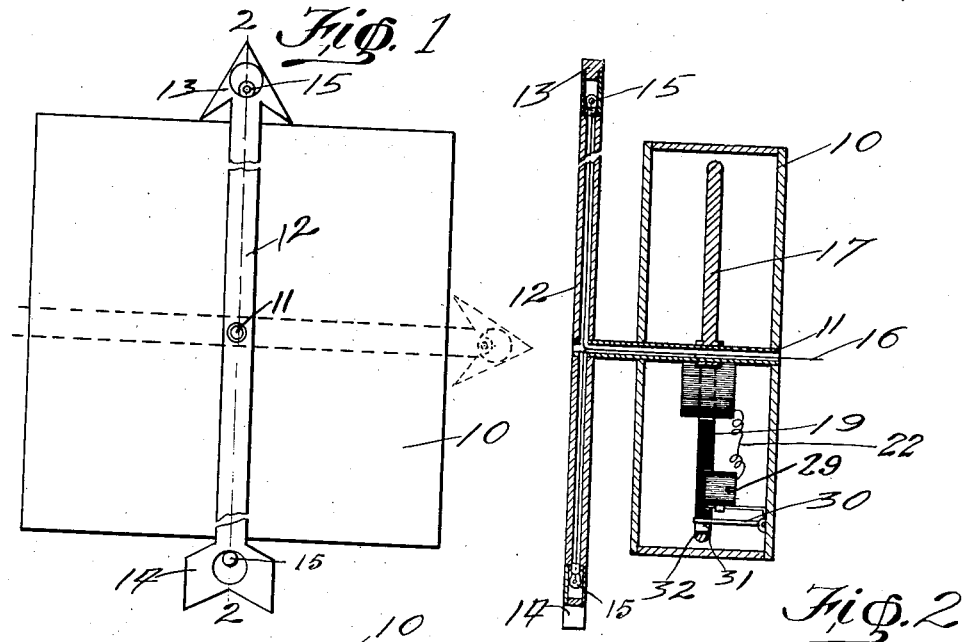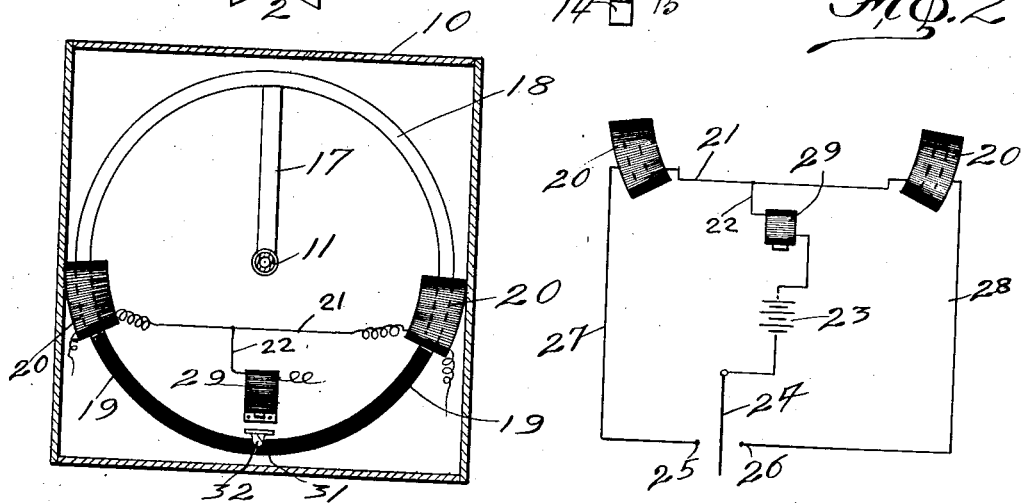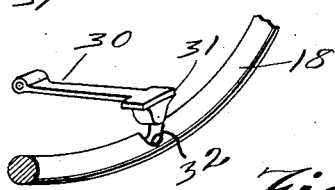

CHARLES P. DIEMER, OF SAPULPA, OKLAHOMA.

INDICATING DEVICE FOR VEHICLES.

1,329,043.

Specification of Letters Patent.

Patented Jan. 27, 1920.

Application filed April 9, 1917. Serial No. 160,736.

*To all whom it may concern:*

Be it known that I, CHARLES P. DIEMER, a citizen of the United States, residing at Sapulpa, in the county of Creek, State of Oklahoma, have invented certain new and useful Improvements in Indicating Devices for Vehicles; and I do hereby declare the following to be a full, clear, and exact description of the invention, such as will enable others skilled in the art to which it appertains to make and use the same.

This invention is an improvement in signals and has particular reference to an indicating device for automobiles and other vehicles.

An object of the invention is to provide an improved electrically operated apparatus for actuating a pointer to indicate the direction to be taken by a machine so that pedestrians and drivers of other vehicles may be notified of such direction.

Another object is to provide a device of this character which is simple in construction, easy to manufacture and effective in carrying out the purpose for which it is designed.

The inventive idea involved is capable of receiving a variety of mechanical expressions, one of which for the purpose of illustrating the invention is shown in the accompanying drawing, wherein:—

Figure 1 is a front elevation of the device constructed in accordance with the invention.

Fig. 2 is a vertical section on the line 2—2 of Fig. 1.

Fig. 3 is a similar section taken in a plane at right angles to that of Fig. 2.

Fig. 4 is a detail perspective view of a locking device employed.

Fig. 5 is a diagrammatic view of the electric circuit employed.

The indicating device is shown in the accompanying drawing in what is now believed to be its preferred form and may be mounted in one of several places of a vehicle or automobile such as the radiator or the tire rack or fender on the rear of the car. The device includes a casing 10, preferably of rectangular formation and having a horizontal shaft 11 rotatable therein and extending through the front of the casing where the same is provided with a pointer or indicator 12 preferably in the form of an arrow having its head 13 and tail 14 made partly of glass or having opposed lenses and provided therein with electric bulbs 15 the wires 16 of which extend through the pointer and shaft 11 to the source of power of the usual lights of the machine.

The shaft 11 has mounted thereon intermediate its ends interiorly of the casing 10 one end of a supporting member 17 preferably in the form of an arm, the other end of which is secured to an armature ring 18 which encircles said shaft. The upper major portion of the armature ring 18 is made of iron or other magnetic material and the lower minor portion thereof is made of non-magnetic material, as indicated at 19. Carried by the sides of the casing 10 are the oppositely disposed solenoids 20 through which the armature ring passes and which are adapted to oscillate said ring when the same are energized to transmit a similar movement to the shaft 11 and thus swing the pointer 12 in either direction from its normal position as shown in Fig. 1. In order to limit the movement of the pointer or arrow 12 in either direction so that the same will assume positions at right angles to its normal position, the solenoids 20 are arranged in the path of movement of the arm 17 so that the same will contact said solenoids and thus prevent any further movement of the pointer to its adjusted positions.

The rotation of the armature to bring the arrow into position horizontally at the right or left is due to the fact that the center of the magnetic mass of the armature ring would be brought within either coil 20, according to which is energized by the closing of the circuit through the medium of the switch 24 with the contacts 25 and 26. When the switch is brought into engagement with the contact 25, the arrow will be swung to the left, and when the switch is brought into engagement with the contact 26, the arrow will be moved to the right.

The solenoids 20 are connected by a wire 21 which is in turn connected by a wire 22 through the batteries 23 or other source of power. A switch 24 is in circuit with the battery 23 and is adapted to contact either of the points 25 or 26 to close the circuit through a wire 27 or 28 respectively, the latter wires being connected to the solenoids 20 so that when the circuit is closed one of said solenoids will be energized and thus oscillate the armature ring 18 to produce the desired result.

Means are preferably provided in connection with the armature ring 18 for locking the same in its normal position whereby the movement or jolting of the machine will not affect the pointer 12 and said means preferably comprises an electro-magnet 29 mounted in the casing 10 and introduced into the circuit for energizing the solenoids 20. Pivoted to the rear of the casing is an armature plate 30 having a projection 31 thereon which engages in a notch 32 in the armature ring 18 when the same is in normal position, but when the circuit is closed through the switch 24 and the electro-magnet energized, the armature 30 will be lifted and thus disengage the projection 31 from the notch 32 and release the ring 18 from rotary movement. When the circuit is again opened by throwing out the switch 24 the pointer 12 and consequently the ring 18 will be returned to normal position by the weight of the tail 14 of the pointer, and when reaching normal position, the projection 31 will engage the notch 32 and thus lock the parts in their normal position.

What is claimed is:—

1. An indicating device for vehicles, comprising a casing, a tubular shaft rotatable in the casing and extending without the same, an arrow carried upon the shaft outwardly of the casing, illuminating means for the arrow, said arrow constituting a pointer to indicate direction of travel, and being normally disposed in a vertical position, a vertical arm fixed to the shaft, an armature ring carried by the arm within the casing and having a magnetic major upper portion and a non-magnetic minor lower portion, solenoids mounted at each side of the casing and receiving the ring therethrough, said solenoids being disposed upon the lower portion of the magnetic part of the ring, the lower portion of the ring having a notch therein, an armature plate pivoted to the casing and having a projection normally held in the notch of the ring to prevent turning of the latter, and an electrical circuit including a source of energy and said solenoids, said circuit including a connection between the solenoids, means for closing the circuit through either solenoid and means for releasing the armature plate.

2. An indicating device for vehicles, comprising a casing, a tubular shaft rotatable in the casing and extending without the same, an arrow carried upon the shaft outwardly of the casing, illuminating means for the arrow, said arrow constituting a pointer to indicate direction of travel and being normally disposed in a vertical position, a vertical arm fixed to the shaft, an armature ring carried by the arm within the casing and having a magnetic major upper portion and a non-magnetic lower portion, solenoids mounted at each side of the casing and receiving the ring therethrough, said solenoids being disposed upon the lower portion of the magnetic part of the ring, the lower portion of the ring having a notch therein, an armature plate pivoted to the casing and having a projection normally held in the notch of the ring to prevent turning of the latter, a normally open circuit including stationary contacts having electrical connection with the solenoids, a connection between the solenoids, a source of energy, a magnet having connection with the connection between the solenoids and the source of energy to attract the armature plate upon energization thereof to release the projection from the notch in the ring, whereby to permit the ring to be rotated, and a switch connected with the source of energy for movement into engagement with either contact to energize said solenoids independently whereby to cause oscillation of the ring at either side together with corresponding movement of the arrow to a horizontal position at the right or left, said ring moving until the center of the magnetic mass thereof is disposed within the respective solenoid energized upon the closing of the circuit, as and for the purposes specified.

In testimony whereof I affix my signature in the presence of two witnesses.

CHARLES P. DIEMER.

Witnesses:
G. G. HENDERSON,
JAS. W. COLLINS.